United States Patent
Yohai et al.

(10) Patent No.: US 10,432,665 B1
(45) Date of Patent: Oct. 1, 2019

(54) CREATING, MANAGING AND DEPLOYING DECEPTIONS ON MOBILE DEVICES

(71) Applicant: ILLUSIVE NETWORKS LTD., Tel Aviv (IL)

(72) Inventors: Tal Yohai, Givataim (IL); Ofir Lauber, Rishon le Zion (IL); Yoav Epelman, Yavne (IL)

(73) Assignee: ILLUSIVE NETWORKS LTD., Tel Aviv (IL)

( * ) Notice: Subject to any disclaimer, the term of this patent is extended or adjusted under 35 U.S.C. 154(b) by 0 days.

(21) Appl. No.: 16/120,345

(22) Filed: Sep. 3, 2018

(51) Int. Cl.
  *H04L 29/06* (2006.01)

(52) U.S. Cl.
  CPC ........ *H04L 63/1491* (2013.01); *H04L 63/145* (2013.01)

(58) Field of Classification Search
  None
  See application file for complete search history.

(56) References Cited

U.S. PATENT DOCUMENTS

| | | | |
|---|---|---|---|
| 6,363,489 B1 | 3/2002 | Comay et al. |
| 6,618,709 B1 | 9/2003 | Sneeringer |
| 7,065,657 B1 | 6/2006 | Moran |
| 7,089,589 B2 | 8/2006 | Chefalas et al. |
| 7,093,291 B2 | 8/2006 | Bailey |
| 7,516,227 B2 | 4/2009 | Cohen |
| 7,574,741 B2 | 8/2009 | Aviani et al. |
| 7,636,944 B2 | 12/2009 | Raikar |
| 7,665,134 B1 | 2/2010 | Hernacki et al. |
| 7,694,339 B2 | 4/2010 | Blake et al. |
| 7,725,937 B1 | 5/2010 | Levy |
| 7,752,664 B1 | 7/2010 | Satish et al. |
| 7,945,953 B1 | 5/2011 | Salinas et al. |

(Continued)

FOREIGN PATENT DOCUMENTS

| | | |
|---|---|---|
| WO | 2006131124 A1 | 12/2006 |
| WO | 2015001969 A1 | 1/2015 |
| WO | 2015047555 A1 | 4/2015 |

OTHER PUBLICATIONS

Wikipedia, Active Directory, https://en.wikipedia.org/wiki/Active_Directory, Jun. 24, 2015.

(Continued)

*Primary Examiner* — Fatoumata Traore
(74) *Attorney, Agent, or Firm* — Soquel Group I.P Ltd

(57) ABSTRACT

A system for managing attacker incidents, including a mobile device manager (MDM) receiving instructions to deploy deceptions on a mobile device used by an employee of an organization in conjunction with a network of the organization and, in response to the instructions, running a dedicated agent on the mobile device, wherein the dedicated agent is configured to register the mobile device and its current deceptions state, and install deceptions in the mobile device, a trap server triggering an incident in response to an attacker attempting to use deceptive data that was installed in the mobile device, and a deception management server sending instructions to the MDM to deploy deceptions on the mobile device, registering the mobile device and its deceptions state, receiving the notification from the trap server that an incident has occurred, and in response thereto instructing the MDM to run forensics on the mobile device.

7 Claims, 7 Drawing Sheets

(56) References Cited

U.S. PATENT DOCUMENTS

| | | | |
|---|---|---|---|
| 8,015,284 B1 | 9/2011 | Isenberg et al. | |
| 8,181,249 B2 | 5/2012 | Chow et al. | |
| 8,181,250 B2 | 5/2012 | Rafalovich et al. | |
| 8,250,654 B1 | 8/2012 | Kennedy et al. | |
| 8,375,447 B2 | 2/2013 | Amoroso et al. | |
| 8,474,047 B2* | 6/2013 | Adelstein | H04L 63/14 713/187 |
| 8,499,348 B1 | 7/2013 | Rubin | |
| 8,528,091 B2 | 9/2013 | Bowen et al. | |
| 8,549,642 B2 | 10/2013 | Lee | |
| 8,549,643 B1 | 10/2013 | Shou | |
| 8,719,938 B2 | 5/2014 | Chasko et al. | |
| 8,739,281 B2 | 5/2014 | Wang et al. | |
| 8,739,284 B1 | 5/2014 | Gardner | |
| 8,769,684 B2 | 7/2014 | Stolfo et al. | |
| 8,819,825 B2 | 8/2014 | Keromytis et al. | |
| 8,856,928 B1 | 10/2014 | Rivner et al. | |
| 8,881,288 B1 | 11/2014 | Levy et al. | |
| 8,925,080 B2 | 12/2014 | Hebert | |
| 9,009,829 B2 | 4/2015 | Stolfo et al. | |
| 9,015,842 B2* | 4/2015 | Troyansky | G06F 21/552 709/224 |
| 9,043,905 B1 | 5/2015 | Allen et al. | |
| 9,124,622 B1 | 9/2015 | Falkowitz et al. | |
| 9,152,808 B1 | 10/2015 | Ramalingam et al. | |
| 9,240,976 B1 | 1/2016 | Murchison | |
| 9,325,728 B1 | 4/2016 | Kennedy et al. | |
| 9,356,942 B1 | 5/2016 | Joffe | |
| 9,386,030 B2 | 7/2016 | Vashist et al. | |
| 9,495,188 B1 | 11/2016 | Ettema et al. | |
| 2002/0066034 A1 | 5/2002 | Schlossberg et al. | |
| 2002/0194489 A1 | 12/2002 | Almogy et al. | |
| 2003/0084349 A1 | 5/2003 | Friedrichs et al. | |
| 2003/0110396 A1 | 6/2003 | Lewis et al. | |
| 2003/0145224 A1 | 7/2003 | Bailey | |
| 2004/0088581 A1 | 5/2004 | Brawn et al. | |
| 2004/0128543 A1 | 7/2004 | Blake et al. | |
| 2004/0148521 A1 | 7/2004 | Cohen et al. | |
| 2004/0160903 A1 | 8/2004 | Gai et al. | |
| 2004/0172557 A1 | 9/2004 | Nakae et al. | |
| 2004/0255155 A1 | 12/2004 | Stading | |
| 2005/0114711 A1 | 5/2005 | Hesselink et al. | |
| 2005/0132206 A1 | 6/2005 | Palliyil et al. | |
| 2005/0149480 A1 | 7/2005 | Deshpande | |
| 2005/0235360 A1 | 10/2005 | Pearson | |
| 2006/0010493 A1 | 1/2006 | Piesco et al. | |
| 2006/0041761 A1 | 2/2006 | Neumann et al. | |
| 2006/0069697 A1 | 3/2006 | Shraim et al. | |
| 2006/0101516 A1 | 5/2006 | Sudaharan et al. | |
| 2006/0161982 A1 | 7/2006 | Chari et al. | |
| 2006/0224677 A1 | 10/2006 | Ishikawa et al. | |
| 2006/0242701 A1 | 10/2006 | Black et al. | |
| 2007/0028301 A1 | 2/2007 | Shull et al. | |
| 2007/0039038 A1 | 2/2007 | Goodman et al. | |
| 2007/0157315 A1 | 7/2007 | Moran | |
| 2007/0192853 A1 | 8/2007 | Shraim et al. | |
| 2007/0226796 A1 | 9/2007 | Gilbert et al. | |
| 2007/0299777 A1 | 12/2007 | Shraim et al. | |
| 2008/0016570 A1 | 1/2008 | Capalik | |
| 2008/0086773 A1 | 4/2008 | Tuvell et al. | |
| 2008/0155693 A1 | 6/2008 | Mikan et al. | |
| 2009/0019547 A1 | 1/2009 | Palliyil et al. | |
| 2009/0144827 A1 | 6/2009 | Peinado et al. | |
| 2009/0222920 A1 | 9/2009 | Chow et al. | |
| 2009/0241173 A1 | 9/2009 | Troyansky | |
| 2009/0241191 A1 | 9/2009 | Keromytis et al. | |
| 2009/0241196 A1 | 9/2009 | Troyansky et al. | |
| 2009/0328216 A1 | 12/2009 | Rafalovich et al. | |
| 2010/0058456 A1 | 3/2010 | Jajodia et al. | |
| 2010/0071051 A1 | 3/2010 | Choyi et al. | |
| 2010/0077483 A1 | 3/2010 | Stolfo et al. | |
| 2010/0082513 A1 | 4/2010 | Liu | |
| 2010/0251369 A1 | 9/2010 | Grant | |
| 2010/0269175 A1 | 10/2010 | Stolfo et al. | |
| 2011/0016527 A1 | 1/2011 | Yanovsky et al. | |
| 2011/0154494 A1 | 6/2011 | Sundaram et al. | |
| 2011/0167494 A1 | 7/2011 | Bowen et al. | |
| 2011/0214182 A1 | 9/2011 | Adams et al. | |
| 2011/0258705 A1 | 10/2011 | Vestergaard et al. | |
| 2011/0302653 A1 | 12/2011 | Frantz et al. | |
| 2011/0307705 A1 | 12/2011 | Fielder | |
| 2012/0005756 A1 | 1/2012 | Hoefelmeyer et al. | |
| 2012/0084866 A1 | 4/2012 | Stolfo | |
| 2012/0167208 A1 | 6/2012 | Buford et al. | |
| 2012/0210388 A1 | 8/2012 | Kolishchak | |
| 2012/0246724 A1 | 9/2012 | Sheymov et al. | |
| 2012/0311703 A1 | 12/2012 | Yanovsky et al. | |
| 2013/0061055 A1 | 3/2013 | Schibuk | |
| 2013/0086691 A1 | 4/2013 | Fielder | |
| 2013/0212644 A1 | 8/2013 | Hughes et al. | |
| 2013/0227697 A1 | 8/2013 | Zandani | |
| 2013/0263226 A1 | 10/2013 | Sudia | |
| 2014/0082730 A1 | 3/2014 | Vashist et al. | |
| 2014/0101724 A1 | 4/2014 | Wick et al. | |
| 2014/0115706 A1 | 4/2014 | Silva et al. | |
| 2014/0201836 A1 | 7/2014 | Amsler | |
| 2014/0208401 A1 | 7/2014 | Balakrishnan et al. | |
| 2014/0237599 A1 | 8/2014 | Gertner et al. | |
| 2014/0259095 A1 | 9/2014 | Bryant | |
| 2014/0298469 A1 | 10/2014 | Marion et al. | |
| 2014/0310770 A1 | 10/2014 | Mahaffey | |
| 2014/0337978 A1 | 11/2014 | Keromytis et al. | |
| 2014/0359708 A1 | 12/2014 | Schwartz | |
| 2015/0007326 A1 | 1/2015 | Mooring et al. | |
| 2015/0013006 A1 | 1/2015 | Shulman et al. | |
| 2015/0047032 A1 | 2/2015 | Hannis et al. | |
| 2015/0074750 A1 | 3/2015 | Pearcy et al. | |
| 2015/0074811 A1 | 3/2015 | Capalik | |
| 2015/0096048 A1 | 4/2015 | Zhang et al. | |
| 2015/0128246 A1 | 5/2015 | Feghali et al. | |
| 2015/0156211 A1 | 6/2015 | Chi Tin et al. | |
| 2015/0264062 A1 | 9/2015 | Hagiwara et al. | |
| 2015/0326587 A1 | 11/2015 | Vissamsetty et al. | |
| 2015/0326598 A1 | 11/2015 | Vasseur et al. | |
| 2016/0019395 A1 | 1/2016 | Ramalingam et al. | |
| 2016/0080414 A1 | 3/2016 | Kolton et al. | |
| 2016/0212167 A1 | 7/2016 | Dotan et al. | |
| 2016/0261608 A1 | 9/2016 | Hu et al. | |
| 2016/0300227 A1 | 10/2016 | Subhedar et al. | |
| 2016/0308895 A1 | 10/2016 | Kotler et al. | |
| 2016/0323316 A1 | 11/2016 | Kolton et al. | |
| 2016/0373447 A1 | 12/2016 | Akiyama et al. | |
| 2017/0032130 A1 | 2/2017 | Joseph Durairaj et al. | |
| 2017/0134423 A1* | 5/2017 | Sysman | G06F 21/554 |
| 2018/0309787 A1* | 10/2018 | Evron | G06F 21/121 |

OTHER PUBLICATIONS

Wikpedia, Apple Filing Protocol, https://en.wikipedia.org/wiki/Apple_Filing_Protocol, Aug. 14, 2015.

Wikipedia, DMZ (computing), https://en.wikipedia.org/wiki/DMZ_(computing), Jun. 17, 2015.

Wikipedia, Domain Name System, https://en.wikipedia.org/wiki/Domain_Name_System, Jul. 14, 2015.

Wikipedia, Firewall (computing), https://en.wikipedia.org/wiki/Firewall_(computing), Jul. 14, 2015.

Wikipedia, Honeypot (computing), https://en.wikipedia.org/wiki/Honeypot_(computing), Jun. 21, 2015.

Wikipedia, Kerberos (protocol), https://en.wikipedia.org/wiki/Kerberos_(protocol), Jun. 30, 2015.

Wikipedia, Lightweight Directory Access Protocol, https://en.wikipedia.org/wiki/Lightweight_Directory_Access_Protocol, Aug. 15, 2015.

Wikipedia, LM hash, https://en.wikipedia.org/wiki/LM_hash, Jun. 8, 2015.

Wikipedia, RADIUS, https://en.wikipedia.org/wiki/RADIUS, Aug. 16, 2015.

Wikipedia, Rainbow table, https://en.wikipedia.org/wiki/Rainbow_table, Jul. 14, 2015.

Wikipedia, Secure Shell, https://en.wikipedia.org/wiki/Honeypot_(computing), Jul. 12, 2015.

(56) References Cited

OTHER PUBLICATIONS

Wikipedia, Security Information and Event Management, https://en.wikipedia.org/wiki/Security_information_and_event_management, Jun. 23, 2015.
Wikipedia, Tarpit (networking), hhttps://en.wikipedia.org/wiki/Tarpit_(networking), Jul. 3, 2014.
Mishra et al., Intrusion detection in wireless ad hoc networks, IEEE Wireless Communications, Feb. 2004, pp. 48-60.
Zhang et al., Intrusion detection techniques for mobile wireless networks, Journal Wireless Networks vol. 9(5), Sep. 2003, pp. 545-556, Kluwer Academic Publishers, the Netherlands.
U.S. Appl. No. 15/004,904, Office Action, dated May 27, 2016, 16 pages.
U.S. Appl. No. 15/004,904, Notice of Allowance, dated Oct. 19, 2016, 13 pages.
U.S. Appl. No. 15/175,048, Notice of Allowance, dated Oct. 13, 2016, 17 pages.
U.S. Appl. No. 15/175,050, Office Action, dated Aug. 19, 2016, 34 pages.
U.S. Appl. No. 15/175,050, Office Action, dated Nov. 30, 2016, 31 pages.
U.S. Appl. No. 15/175,050, Notice of Allowance, dated Mar. 21, 2017, 13 pages.
U.S. Appl. No. 15/175,052, Office Action, dated Feb. 13, 2017, 19 pages.
U.S. Appl. No. 15/175,052, Office Action, dated Jun. 6, 2017, 19 pages.
U.S. Appl. No. 15/175,054, Notice of Allowance, dated Feb. 21, 2017, 13 pages.
U.S. Appl. No. 15/403,194, Office Action, dated Feb. 28, 2017, 13 pages.
U.S. Appl. No. 15/403,194, Notice of Allowance, dated Jun. 16, 2017, 9 pages.
U.S. Appl. No. 15/406,731, Notice of Allowance, dated Apr. 20, 2017.
PCT Application No. PCT/IL16/50103, International Search Report and Written Opinion, dated May 26, 2016, 9 pages.
PCT Application No. PCT/IL16/50579, International Search Report and Written Opinion, dated Sep. 30, 2016, 7 pages.
PCT Application No. PCT/IL16/50581, International Search Report and Written Opinion, dated Nov. 29, 2016, 10 pages.
PCT Application No. PCT/IL16/50582, International Search Report and Written Opinion, dated Nov. 16, 2016, 11 pages.
PCT Application No. PCT/IL16/50583, International Search Report and Written Opinion, dated Dec. 8, 2016, 10 pages.
U.S. Appl. No. 15/175,052, Notice of Allowance, dated Jan. 2, 2018, 9 pages.
U.S. Appl. No. 15/679,180, Notice of Allowance, dated Mar. 26, 2018, 14 pages.
U.S. Appl. No. 15/722,351, Office Action, dated Mar. 9, 2018, 17 pages.
U.S. Appl. No. 15/722,351, Notice of Allowance, dated Aug. 8, 2018, 8 pages.
U.S. Appl. No. 15/682,577, Notice of Allowance, dated Jun. 14, 2018, 15 pages.
U.S. Appl. No. 15/641,817, Office Action, dated Jul. 26, 2018, 29 pages.

* cited by examiner

CREATING, MANAGING AND DEPLOYING DECEPTIONS ON MOBILE DEVICES

CROSS REFERENCES TO RELATED APPLICATIONS

The contents of the following of applicant's US patent applications are hereby incorporated herein in their entireties.

- U.S. patent application Ser. No. 15/722,351, entitled SYSTEM AND METHOD FOR CREATION, DEPLOYMENT AND MANAGEMENT OF AUGMENTED ATTACKER MAP, and filed on Oct. 2, 2017 by inventors Shlomo Touboul, Hanan Levin, Stephane Roubach, Assaf Mischari, Itai Ben David, Itay Avraham, Adi Ozer, Chen Kazaz, Ofer Israeli, Olga Vingurt, Liad Gareh, Israel Grimberg, Cobby Cohen, Sharon Sultan and Matan Kubovsky.
- U.S. patent application Ser. No. 15/403,194, now U.S. Pat. No. 9,787,715, entitled SYSTEM AND METHOD FOR CREATION, DEPLOYMENT AND MANAGEMENT OF AUGMENTED ATTACKER MAP, and filed on Jan. 11, 2017 by inventors Shlomo Touboul, Hanan Levin, Stephane Roubach, Assaf Mischari, Itai Ben David, Itay Avraham, Adi Ozer, Chen Kazaz, Ofer Israeli, Olga Vingurt, Liad Gareh, Israel Grimberg, Cobby Cohen, Sharon Sultan and Matan Kubovsky.
- U.S. patent application Ser. No. 15/004,904, now U.S. Pat. No. 9,553,885, entitled SYSTEM AND METHOD FOR CREATION, DEPLOYMENT AND MANAGEMENT OF AUGMENTED ATTACKER MAP, and filed on Jan. 23, 2016 by inventors Shlomo Touboul, Hanan Levin, Stephane Roubach, Assaf Mischari, Itai Ben David, Itay Avraham, Adi Ozer, Chen Kazaz, Ofer Israeli, Olga Vingurt, Liad Gareh, Israel Grimberg, Cobby Cohen, Sharon Sultan and Matan Kubovsky.
- U.S. Provisional Application No. 62/172,251, entitled SYSTEM AND METHOD FOR CREATION, DEPLOYMENT AND MANAGEMENT OF AUGMENTED ATTACKER MAP, and filed on Jun. 8, 2015 by inventors Shlomo Touboul, Hanan Levin, Stephane Roubach, Assaf Mischari, Itai Ben David, Itay Avraham, Adi Ozer, Chen Kazaz, Ofer Israeli, Olga Vingurt, Liad Gareh, Israel Grimberg, Cobby Cohen, Sharon Sultan and Matan Kubovsky.
- U.S. Provisional Application No. 62/172,253, entitled SYSTEM AND METHOD FOR MULTI-LEVEL DECEPTION MANAGEMENT AND DECEPTION SYSTEM FOR MALICIOUS ACTIONS IN A COMPUTER NETWORK, and filed on Jun. 8, 2015 by inventors Shlomo Touboul, Hanan Levin, Stephane Roubach, Assaf Mischari, Itai Ben David, Itay Avraham, Adi Ozer, Chen Kazaz, Ofer Israeli, Olga Vingurt, Liad Gareh, Israel Grimberg, Cobby Cohen, Sharon Sultan and Matan Kubovsky.
- U.S. Provisional Application No. 62/172,255, entitled METHODS AND SYSTEMS TO DETECT, PREDICT AND/OR PREVENT AN ATTACKER'S NEXT ACTION IN A COMPROMISED NETWORK, and filed on Jun. 8, 2015 by inventors Shlomo Touboul, Hanan Levin, Stephane Roubach, Assaf Mischari, Itai Ben David, Itay Avraham, Adi Ozer, Chen Kazaz, Ofer Israeli, Olga Vingurt, Liad Gareh, Israel Grimberg, Cobby Cohen, Sharon Sultan and Matan Kubovsky.
- U.S. Provisional Application No. 62/172,259, entitled MANAGING DYNAMIC DECEPTIVE ENVIRONMENTS, and filed on Jun. 8, 2015 by inventors Shlomo Touboul, Hanan Levin, Stephane Roubach, Assaf Mischari, Itai Ben David, Itay Avraham, Adi Ozer, Chen Kazaz, Ofer Israeli, Olga Vingurt, Liad Gareh, Israel Grimberg, Cobby Cohen, Sharon Sultan and Matan Kubovsky.
- U.S. Provisional Application No. 62/172,261, entitled SYSTEMS AND METHODS FOR AUTOMATICALLY GENERATING NETWORK ENTITY GROUPS BASED ON ATTACK PARAMETERS AND/OR ASSIGNMENT OF AUTOMATICALLY GENERATED SECURITY POLICIES, and filed on Jun. 8, 2015 by inventors Shlomo Touboul, Hanan Levin, Stephane Roubach, Assaf Mischari, Itai Ben David, Itay Avraham, Adi Ozer, Chen Kazaz, Ofer Israeli, Olga Vingurt, Liad Gareh, Israel Grimberg, Cobby Cohen, Sharon Sultan and Matan Kubovsky.

FIELD OF THE INVENTION

The present invention relates to computer security, and in particular to preventing attackers from harvesting credentials from an enterprise network.

BACKGROUND OF THE INVENTION

Reference is made to FIG. 1, which is a simplified diagram of a prior art organization network 100 connected to an external internet 10. Network 100 is shown generally with resources including endpoint computers 110, databases 120, switches and routers 130, and mobile devices 140 such as smart phones and tablets, for ease of presentation, although it will be appreciated by those skilled in the art that organization networks today are generally much more complex and include other devices such as printers, other types of network elements such as relays, and any Internet of Things objects. The various connections shown in FIG. 1 may be direct or indirect, wired or wireless communications, or a combination of wired and wireless connections. Endpoint computers 110 and databases 120 may be physical elements or logical elements, or a mix of physical and logical elements. Endpoint computers 110 and databases 120 may be virtual machines. Endpoint computer 110 and databases 120 may be local, remote or cloud-based elements, or a mix of local, remote and cloud-based elements. Endpoint computers 110 may be client workstation computers, or server computers including inter alia file transfer protocol (FTP) servers, email servers, structured query language (SQL) servers, secure shell (SSH) servers and other application servers, or a mix of client and server computers. An organization's information technology (IT) department manages and controls network 100 in order to serve the organization's requirements and meet the organization's needs.

Access to endpoint computers 110 and databases 120 in network 100 may optionally be governed by an access governor 150, such as a directory service, that authorizes users to access endpoint computers 110 and databases 120 based on "credentials". Access governor 150 may be a name directory, such as ACTIVE DIRECTORY® developed by Microsoft Corporation of Redmond, Wash., for WINDOWS® environments. Background information about ACTIVE DIRECTORY® is available at Wikipedia. Other access governors for WINDOWS and non-WINDOWS environments, include inter alia Lightweight Directory Access Protocol (LDAP), Remote Authentication Dial-In User Service (RADIUS), and Apple Filing Protocol (AFP), formerly APPLETALK®, developed by Apple Inc. of Cupertino, Calif. Background information about LDAP, RADIUS and AFP is available at Wikipedia.

Access governor 150 may be one or more local machine access controllers. Access governor 150 may be one or more authorization servers, such as a database server or an application server.

In lieu of access governor 150, the endpoints and/or servers of network 100 determine their local access rights.

Credentials for accessing endpoint computers 110 and databases 120 include inter alia server account credentials such as <address> <username> <password> for an FTP server, an SQL server, or an SSH server. Credentials for accessing endpoint computers 110 and databases 120 also include user login credentials <username> <password>, or <username> <ticket>, where "ticket" is an authentication ticket, such as a ticket for the Kerberos authentication protocol or NTLM hash used by Microsoft Corp., or login credentials via certificates or via another implementation used today or in the future. Background information about the Kerberos protocol and the LM hash is available at Wikipedia.

Access governor 150 may maintain a directory of endpoint computers 110, databases 120 and their users. Access governor 150 authorizes users and computers, assigns and enforces security policies, and installs and updates software. When a user logs into an endpoint computer 110, access governor 150 checks the submitted password, and determines if the user is an administrator (admin), a normal user (user) or other user type.

Endpoint computers 110 may run a local or remote security service, which is an operating system process that verifies users logging in to computers and other single sign-on systems and other credential storage systems.

Network 100 may include a security information and event management (SIEM) server 160, which provides real-time analysis of security alerts generated by network hardware and applications. Background information about SIEM is available at Wikipedia.

Network 100 may include a domain name system (DNS) server 170, or such other name service system, for translating domain names to IP addresses. Background information about DNS is available at Wikipedia.

Network 100 may include a firewall 180 located within a demilitarized zone (DMZ), which is a gateway between organization network 100 and external internet 10. Firewall 180 controls incoming and outgoing traffic for network 100. Background information about firewalls and DMZ is available at Wikipedia.

One of the most prominent threats that organizations face is a targeted attack; i.e., an individual or group of individuals that attacks the organization for a specific purpose, such as leaking data from the organization, modifying data and systems, and sabotaging data and systems.

Targeted attacks are carried out in multiple stages, typically including inter alia reconnaissance, penetration, lateral movement and payload. Lateral movement involves establishing a foothold within the organization and expanding that foothold to additional systems within the organization.

In order to carry out the lateral movement stage, an attacker, whether a human being who is operating tools within the organization's network, or a tool with "learning" capabilities, learns information about the environment it is operating in, such as network topology, organization structure, and implemented security solutions, and then operates in accordance with that data. One method to defend against such attacks is to plant misleading information/decoys/bait with the aim that the attacker learns of their existence and consumes those bait resources, which are monitored so as to notify an administrator of malicious activity. In order to monitor usage of deceptive information, trap servers, referred to as "honeypots", are deployed in the organization. Background information about honeypots is available at Wikipedia.

With the influx of Generation Y and the increasing demand for flexible working, the shift from company owned devices to employees bringing their own devices is having a massive impact on how IT departments react to mobile security.

Although "bring your own device" is an attractive business model, there are a number of security risks associated with it. With data security being the number one concern for CEOs, ensuring that an IT environment is secure is more paramount than ever.

Use of employee smartphones within an organization has many security drawbacks.

Smartphones, as computers, are preferred targets of attacks. These attacks exploit weaknesses inherent in smartphones that arise from the communication modes including inter alia Short Message Service (SMS), also referred to as "text messaging", Multimedia Messaging Service (MMS), Wi-Fi, Bluetooth and GSM. In additional there are exploits that target software vulnerabilities in the smartphone browser or operating system.

Smartphones generally have access to both the World Wide Web and the inner organizational network via the organization's Wi-Fi network. Often smartphones contain sensitive organization information, including inter alia organization mail, project notes, pictures and videos.

Unlike desktop computers and servers, smartphones are not always monitored by the IT department, because they belong to the employees (bring your own device) and not to the organization.

Monitoring smartphones via Mobile Device Management (MDM) includes installing security tools such as antivirus tools on the smartphones, but these security tools are not always effective for detecting advanced persistent threats (APTs).

At present, a deception solution for smartphones does not exist, and there is no reliable detection tool for APTs. As such, there is a need for a security solution to protect organizations against attackers that breach mobile phones belonging to employees of the organization that operate in conjunction with the organization's network.

SUMMARY

Embodiments of the present invention create, manage and deploy deceptions on mobile devices, leading a potential attacker to a trap server that alerts the organization's security administrators.

Embodiments of the present invention provide a new layer of defense for smartphones. One embodiment employs a mobile device manager (MDM) to deploy deceptions on mobile devices. An alternative embodiment avoids use of an MDM and instead uses dedicated applications on mobile devices to deploy deceptions on mobile devices. In both embodiments, when an attacker attempts to use deceptive data retrieved from a mobile device, a trap server reports an incident to a deception manager server, and forensics of the mobile device are collected to monitor the attacker.

There is thus provided in accordance with an embodiment of the present invention a system for managing attacker incidents on a mobile device, including a mobile device manager (MDM) receiving instructions to deploy deceptions on a mobile device used by an employee of an organization in conjunction with a network of the organization and, in response to the instructions, running a dedicated agent on the mobile device, wherein the dedicated agent is configured to register the mobile device and its current deceptions state, receive a list of deceptions to install in the mobile device, and install the deceptions in the received list in the mobile device, a trap server triggering an incident in response to an attacker attempting to use deceptive data that was installed in the mobile device by the dedicated agent, and sending a notification that an incident has occurred, and a deception management server sending instructions to the MDM to deploy deceptions on the mobile device, sending the list of deceptions to the MDM, registering the mobile device and its deceptions state, receiving the notification from the trap server that an incident has occurred, in response thereto instructing the MDM to run forensics on the mobile device, and receiving the forensics from the dedicated agent.

There is additionally provided in accordance with an embodiment of the present invention a method for managing attacker incidents on a mobile device, including instructing, by a deception management server, a mobile device manager (MDM) to deploy deceptions on a mobile device used by an employee of an organization in conjunction with a network of the organization, in response to the instructing running, by the MDM, a dedicated agent on the mobile device, registering, by the dedicated agent, the mobile device and its current deceptions state with the deception management server, receiving, by the dedicated agent from the deception management server, a list of deceptions to install in the mobile device, installing, by the dedicated agent, the deceptions in the received list in the mobile device, wherein the received deceptions include data leading to a trap server, attempting, by an attacker, to use deceptive data installed in the mobile phone, to connect to a service, in response to the attempting, triggering an incident in the trap server, notifying, by the trap server, the deception management server, that an incident has occurred, further instructing the MDM, by the deception management server, to run forensics on the mobile device, in response to the further instructing, running by the MDM, forensics on the mobile device, and transmitting forensic data, by a forensics collector in the dedicated agent, to the deception management server.

There is further provided in accordance with an embodiment of the present invention a method for managing attacker incidents on a mobile device, including downloading, by a mobile device, a dedicated application, running by the mobile device, the dedicated application with parameters provided by a deception management server, registering, by the dedicated application, the mobile device and its current deceptions state with the deception management server, receiving, by the dedicated application from the deception management server, a list of deceptions to install in the mobile device, installing, by the dedicated agent, the deceptions in the received list in the mobile device, attempting, by an attacker, to use deceptive data in the mobile phone, to connect to a service, in response to the attempting, triggering an incident in a trap server, notifying, by the trap server, the dedicate application, that an incident has occurred, running by the dedicated application, forensics on the mobile device, and transmitting forensic data, by a forensics collector in the dedicated application, to the deception management server.

BRIEF DESCRIPTION OF THE DRAWINGS

The present invention will be more fully understood and appreciated from the following detailed description, taken in conjunction with the drawings in which.

For reference to the figures, the following index of elements and their numerals is provided. Similarly numbered elements represent elements of the same type, but they need not be identical elements.

TABLE I

Elements in the figures

| Element | Description |
|---------|-------------|
| 10 | Internet |
| 100 | enterprise network |
| 110 | endpoint computer |
| 120 | network databases |
| 130 | network switches and routers |
| 140 | mobile devices |
| 150 | access governor (optional) |
| 160 | STEM server |
| 170 | DNS server |
| 180 | firewall |
| 200 | enterprise network with mobile device management |
| 210 | mobile devices |
| 220 | deception management server |
| 225 | management console GUI |
| 230 | trap server |
| 240 | IPSec tunnel |
| 250 | MDM gateway server |
| 260 | MDM device management server |
| 270 | management console |
| 280 | domain controller |
| 290 | database server |
| 300 | dedicated agent |
| 310 | mobile app store (Android/iOS) |

Elements numbered in the 1000's are operations of flow charts.

The following definitions are employed throughout the specification.

DECEPTION MANAGEMENT SERVER—refers to a server that manages and controls the systems and data flows. The deception management server registers the mobile devices in the organization, and saves the deceptions state, also referred to as the "snapshot" of the mobile devices, and knows where to plan which deceptions. The deception management server sets parameters and configurations.

MOBILE DEVICE MANAGEMENT (MDM)—refers to a server that handles administration of mobile devices in the organization, including inter alia, smartphones, tablets, laptops and desktops. The MDM runs an Android/iOS agent on the mobile devices and collects forensic data from the mobile devices.

TRAP SERVER—refers to a server to which attempts by an attacker to use deceptive data from mobile phones, are directed. The trap server listens for connections from various protocols, including inter alia HTTP, HTTPS and SSH.

DETAILED DESCRIPTION

In accordance with embodiments of the present invention, systems and methods are provided for generating, managing and deploying deceptions in mobile devices. These deceptions lead an attacker to a trap server, where his activity is monitored and forensics are collected.

Figure 1:
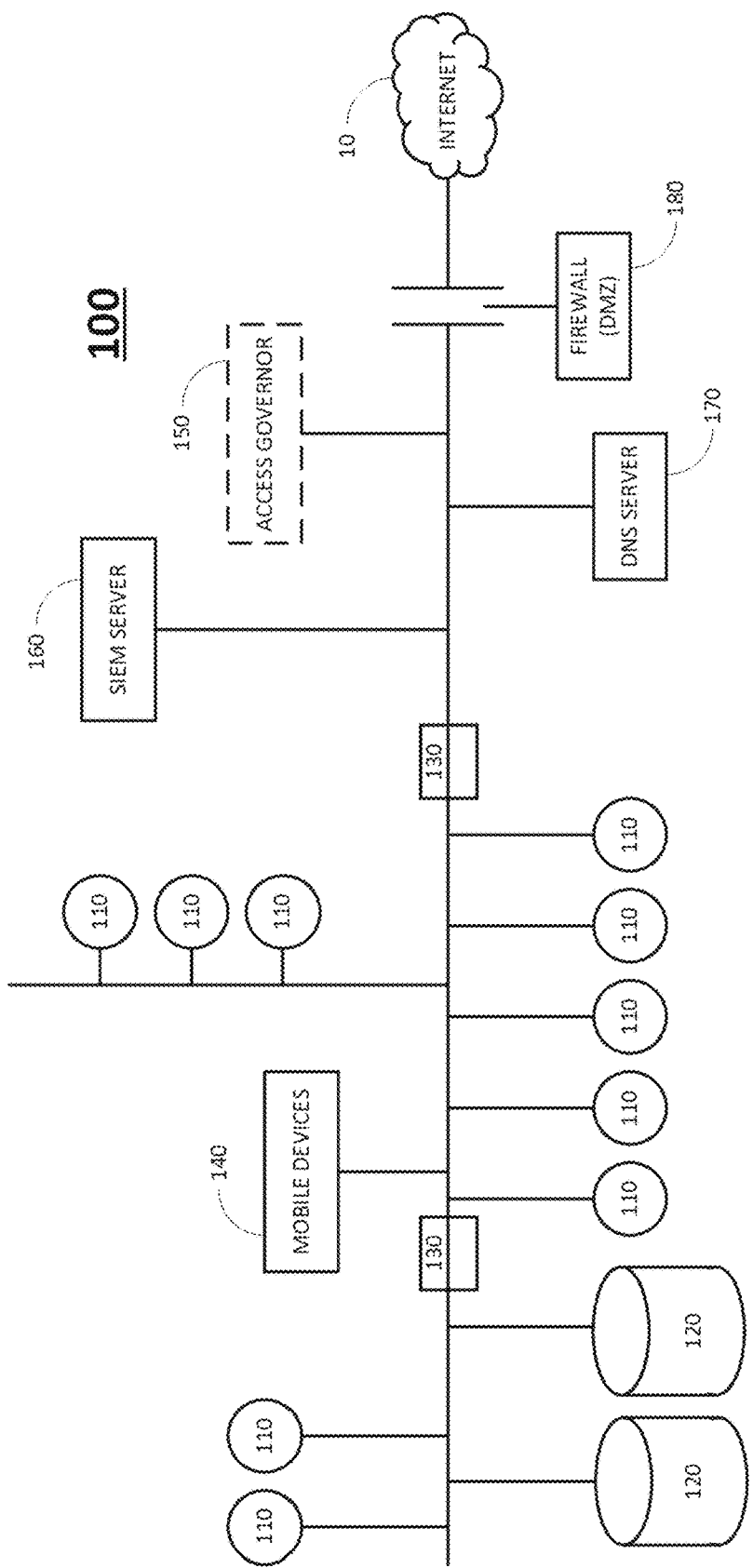
FIG. 1 is a simplified diagram of a prior art enterprise network connected to an external internet.
Figure 2:
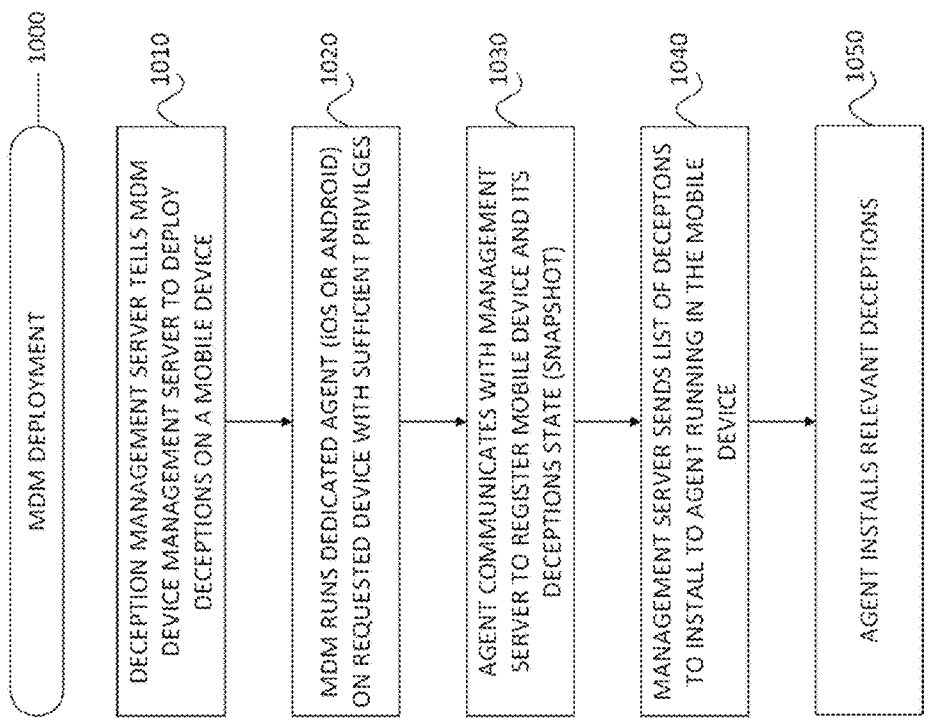
FIG. 2 is a simplified flowchart of a method for mobile device management (MDM) deployment, in accordance with an embodiment of the present invention.
Figure 3:
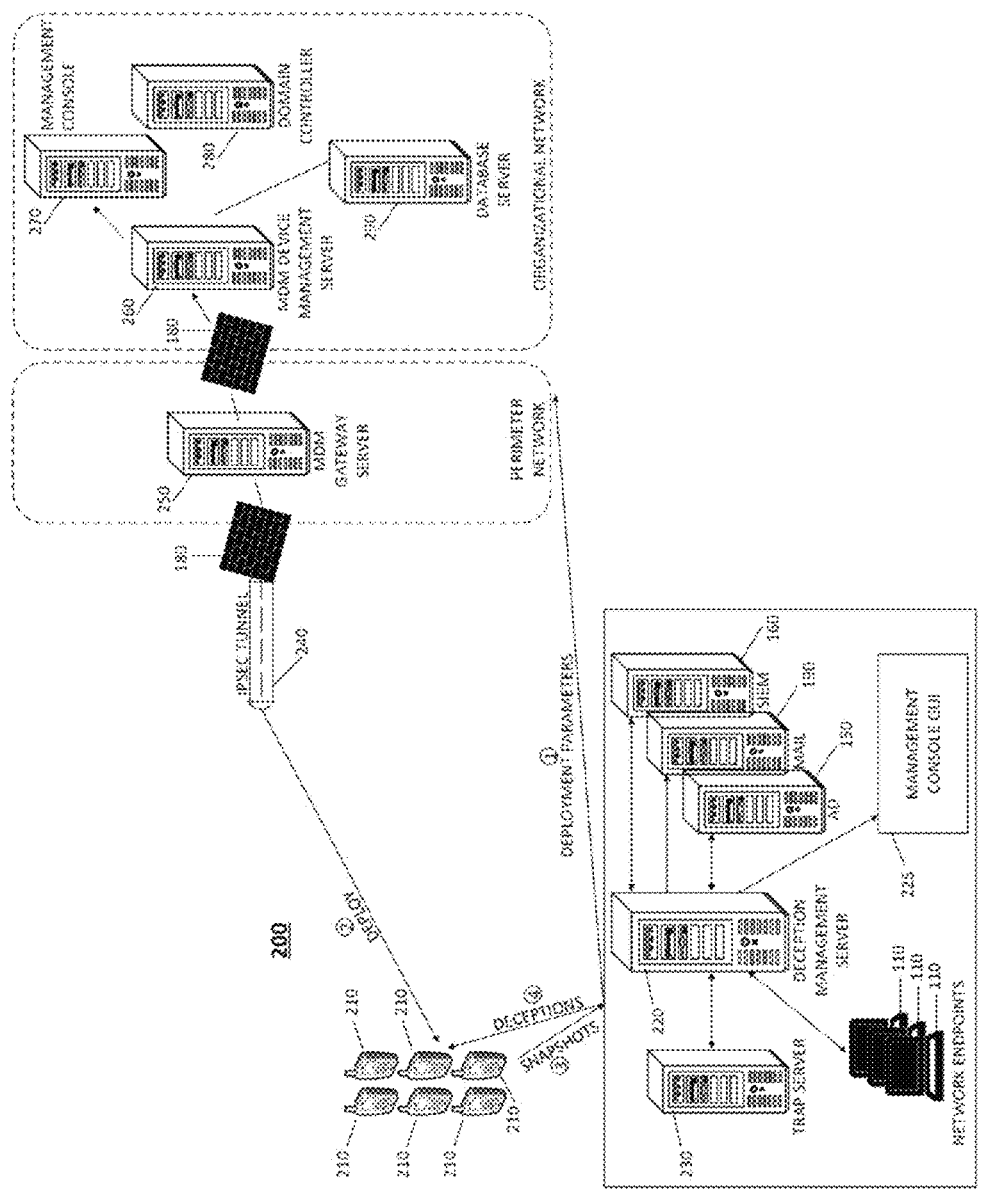
FIG. 3 is a simplified diagram of a system for MDM deployment, in accordance with an embodiment of the present invention.

Reference is made to FIG. 2, which is a simplified flowchart of a method 1000 for mobile device management (MDM) deployment, in accordance with an embodiment of the present invention. Reference is also made to FIG. 3, which is a simplified diagram of a system 200 for MDM deployment, in accordance with an embodiment of the present invention. Shown in FIG. 3 are mobile devices 210, a deception management server 220, a management console GUI 225, a trap server 230, an Internet Protocol Security (IPSec) tunnel 240, a mobile device management (MDM) gateway server 250, an MDM device management server 260, a management console 270, a domain controller 280, and a database server 290. MDM gateway server 250 belongs to a perimeter network. MDM device management server 260, management console 270, domain controller 280, and database server 290 belong to the organizational network.

Mobile devices 210, which are owned by employees of an organization, are used by the employees for carrying out work of the organization, and access an organizational network. As such, mobile devices 210 may hold sensitive information and credentials, which are desirable targets of an attacker. Mobile devices 210 include inter alia smartphones, tablet devices, laptops and desktop computers.

Deception management server 220, manages and controls system flows and data. Deception management server 220 saves the deception state, referred to as the "snapshot", of each device in the organization, and knows where to plant which deceptions. Deception management server 220 is used to set configurations.

Deceptions are routed to trap server 230, which listens for connections from all common protocols, including inter alia HTTP, HTTPS and SSH. Trap server 230 may be publicly exposed to the Internet, depending on its configuration.

MDM device management server 260, which belongs to the organizational network, and which handles administration of mobile devices 210. MDM device manager server 260 runs Android/iOS agents and forensics on mobile devices 210. MDM device manager server is an optional but recommended component. At alternative embodiment is to install dedicated mobile applications on all mobile devices 210, where the mobile applications manage and deploy deceptions on mobile devices 210.

At operation 1010, deception management server 220 tells MDM device management server 260 to deploy deceptions on a mobile device 210, as indicated by the circled 1 in FIG. 3. At operation 1020, MDM device management server 260 runs a dedicated iOS or Android agent on the requested mobile device 210 with sufficient privileges, as indicated by the circled 2 in FIG. 3. At operation 1030, the dedicated agent communicates with deception management server 220 to register the requested mobile device 210 and its deceptions state; i.e., its snapshot, as indicated by the circled 3 in FIG. 3. At operation 1040, deception management server 220 sends a list of deceptions to install, to the dedicated agent running in the requested mobile device 210, as indicated by the circled 4 in FIG. 3. At operation 1050, the dedicated agent installs the deceptions received from deception management server 220.

There is a wide variety of types of mobile deceptions that are planted in mobile devices 210, including inter alia:

Applications—deceptive data planted in personal and organizational applications, in LINKEDIN®, in TWITTER®, in FACEBOOK®, in GMAIL®, in GOOGLE HANGOUTS®, and in Google Drive;
Browsers—deceptive URLs planted in local browsers;
E-mail—deceptive data planted in e-mail;
Files—files containing data leading to deceptive entities;
Network—deceptive network device leading to trap server;
SSH/Telnet—data leading to deceptive entities; and
Users—deceptive users and deceptive user credentials.

Figure 4:
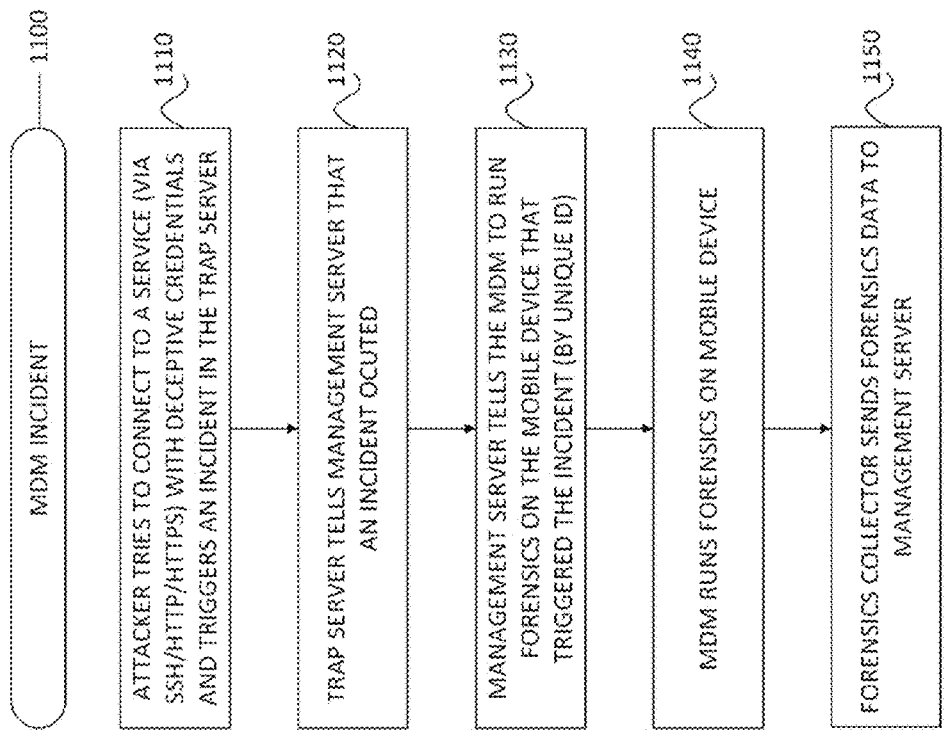
FIG. 4 is a simplified flowchart of a method for attacker incident flow using MDM, in accordance with an embodiment of the present invention.
Figure 5:
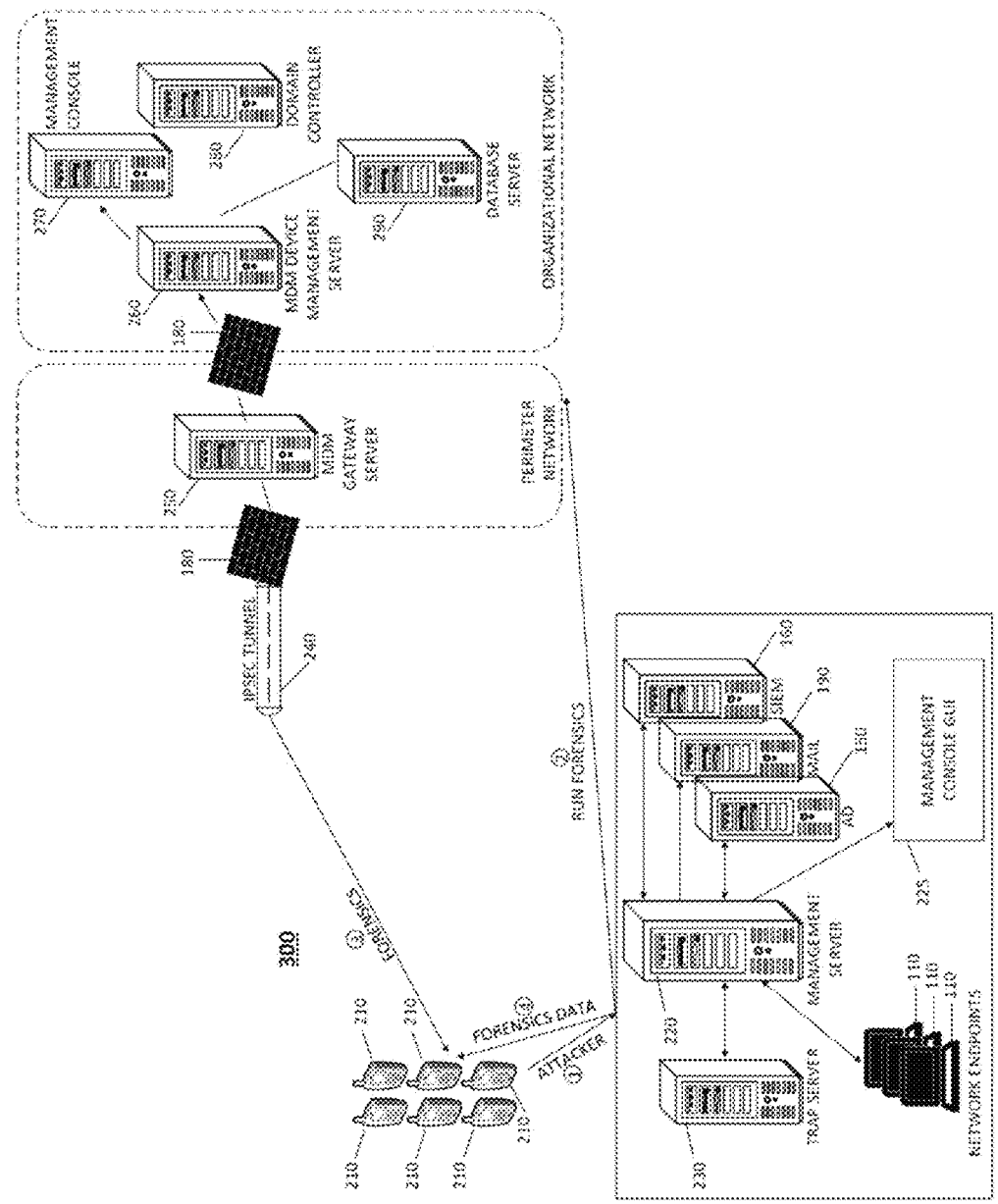
FIG. 5 is a simplified diagram of a system for attacker incident response using MDM, in accordance with an embodiment of the present invention.

Reference is made to FIG. 4, which is a flowchart of a method 1100 for attacker incident flow using MDM, in accordance with an embodiment of the present invention. Reference is also made to FIG. 5, which is a simplified diagram of a system 300 for attacker incident response using MDM, in accordance with an embodiment of the present invention.

At operation 1110 an attacker attempts to connect to a service via a protocol including inter alia HTTP, HTTPS and SSH, using deceptive credentials retrieved from a mobile device 210 as indicated by the circled 1 in FIG. 5. The attempt triggers an incident in trap server 230. At operation 1120, trap server 230 informs deception management server 220 that an incident occurred. At operation 1130, deception management server 220 instructs MDM device management server 260 to run forensics on the mobile device 210 that triggered the incident, as indicated by the circled 2 in FIG. 5. It is noted in this regard that each mobile device 210 has a unique ID, thus making it possible to identify the specific mobile device 210 from which the deceptive credentials originated. At operation 1140, MDM device management server 260 runs forensics on the specific mobile device 210, as indicated by the circled 3 in FIG. 5. At operation 1150, a forensics collector in the mobile device 210 sends forensic data to deception management server 230, as indicated by the circled 4 in FIG. 5.

Figure 6:
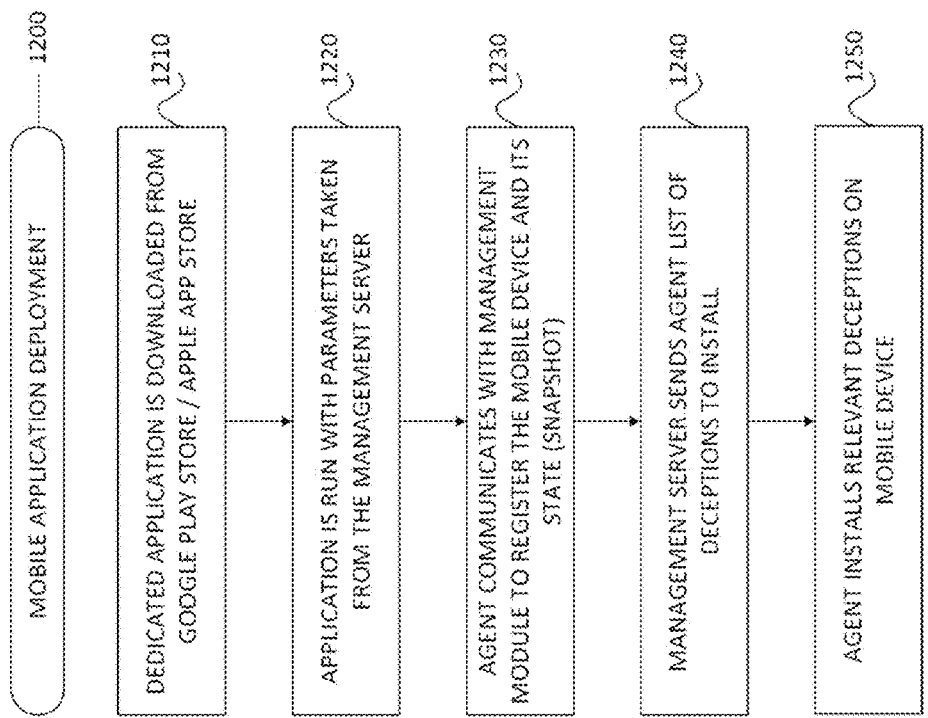
FIG. 6 is a simplified flowchart of a method for mobile app deployment, in accordance with an embodiment of the present invention.
Figure 7:
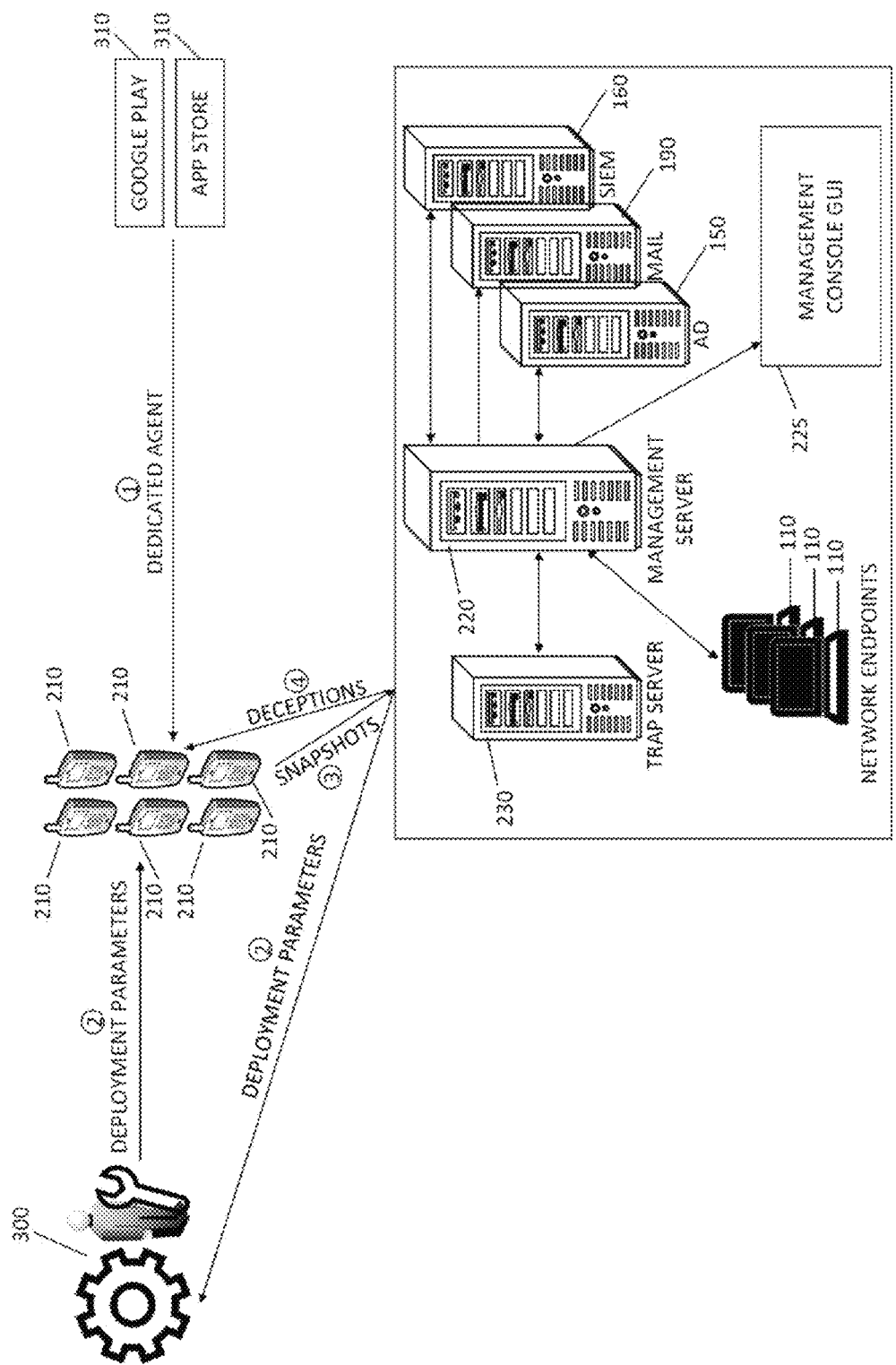
FIG. 7 is a simplified diagram of a system for mobile app deployment, in accordance with an embodiment of the present invention.

Reference is made to FIG. 6, which is a simplified flowchart of a method for mobile application deployment which does not use an MDM device management server, in accordance with an embodiment of the present invention. Reference is also made to FIG. 7, which is a simplified diagram of a system for mobile application deployment which does not use an MDM device management server, in accordance with an embodiment of the present invention. In this regard it is noted that the MDM modules of FIGS. 3 and 5 are not present in FIG. 7.

At operation 1210, each mobile device loads a dedicated application from, inter alia from the Google Play Store or the Apple App Store, as indicated by the circled 1 in FIG. 7. The dedicated application installs an agent 300 in each mobile device. At operation 1220, each mobile device 210 runs the dedicated application using parameters provided by deception management server 220, as indicated by the circled 2 in FIG. 7. At operation 1230, each agent 300 communicates with deception management server 220 to register each mobile device 210 and its state; i.e., its snapshot, as indicated by the circled 3 in FIG. 7. At operation 1240, deception management server 220 sends to each agent 300 a list of deceptions to install in its mobile device 210, as indicated by the circled 4 in FIG. 7. At operation 1250, each agent 300 installs the relevant deception on its mobile device 210.

In the foregoing specification, the invention has been described with reference to specific exemplary embodiments thereof. It will, however, be evident that various modifications and changes may be made to the specific exemplary embodiments without departing from the broader spirit and scope of the invention. Accordingly, the specification and drawings are to be regarded in an illustrative rather than a restrictive sense.

What is claimed is:

1. A system for managing attacker incidents on a mobile device, comprising:
   a mobile device manager (MDM) receiving instructions to deploy deceptions on a mobile device used by an employee of an organization in conjunction with a network of the organization and, in response to the instructions, running a dedicated agent on the mobile device, wherein the dedicated agent is configured to register the mobile device and its current deceptions state, receive a list of deceptions to install in the mobile device, and install the deceptions in the received list in the mobile device;
   a trap server triggering an incident in response to an attacker attempting to use deceptive data that was installed in the mobile device by the dedicated agent, and sending a notification that an incident has occurred; and
   a deception management server sending instructions to said MDM to deploy deceptions on the mobile device, sending the list of deceptions to said MDM, registering the mobile device and its deceptions state, receiving the notification from said trap server that an incident has occurred, in response thereto instructing said MDM to run forensics on the mobile device, and receiving the forensics from the dedicated agent.

2. The system of claim 1 wherein the deceptions installed by said MDM in the mobile device are planted in one or more of: applications installed in the mobile device, a local browser, e-mail and local files.

3. The system of claim 1 wherein the deceptions installed by said MDM in the mobile device include one or more of deceptive network devices and deceptive users and user credentials.

4. A method for managing attacker incidents on a mobile device, comprising:
   instructing, by a deception management server, a mobile device manager (MDM) to deploy deceptions on a mobile device used by an employee of an organization in conjunction with a network of the organization;
   in response to said instructing running, by the MDM, a dedicated agent on the mobile device;
   registering, by the dedicated agent, the mobile device and its current deceptions state with the deception management server;
   receiving, by the dedicated agent from the deception management server, a list of deceptions to install in the mobile device;
   installing, by the dedicated agent, the deceptions in the received list in the mobile device, wherein the received deceptions include data leading to a trap server;
   attempting, by an attacker, to use deceptive data installed in the mobile phone, to connect to a service;
   in response to said attempting, triggering an incident in the trap server;
   notifying, by the trap server, the deception management server, that an incident has occurred;
   further instructing the MDM, by the deception management server, to run forensics on the mobile device;
   in response to said further instructing, running by the MDM, forensics on the mobile device; and
   transmitting forensic data, by a forensics collector in the dedicated agent, to the deception management server.

5. The method of claim 4 wherein the deceptions installed by said MDM in the mobile device are planted in one or more of: applications installed in the mobile device, a local browser, e-mail and local files.

6. The method of claim 4 wherein the deceptions installed by said MDM in the mobile device include one or more of deceptive network devices and deceptive users and user credentials.

7. A method for managing attacker incidents on a mobile device, comprising:
   downloading, by a mobile device, a dedicated application;
   running by the mobile device, the dedicated application with parameters provided by a deception management server;
   registering, by the dedicated application, the mobile device and its current deceptions state with the deception management server;
   receiving, by the dedicated application from the deception management server, a list of deceptions to install in the mobile device;
   installing, by the dedicated agent, the deceptions in the received list in the mobile device;
   attempting, by an attacker, to use deceptive data in the mobile phone, to connect to a service;
   in response to said attempting, triggering an incident in a trap server;
   notifying, by the trap server, the dedicate application, that an incident has occurred;
   running by the dedicated application, forensics on the mobile device; and
   transmitting forensic data, by a forensics collector in the dedicated application, to the deception management server.

* * * * *